May 6, 1952     J. B. PARSONS     2,595,878
SEALING DEVICE FOR PISTON AND CYLINDER ASSEMBLIES
Filed July 3, 1948
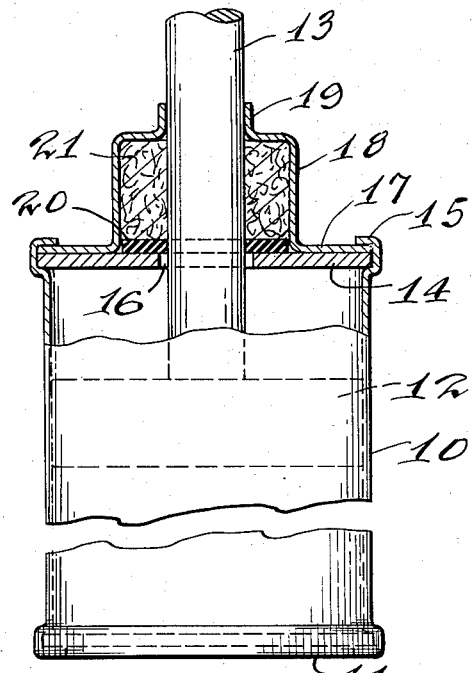
FIG-1-
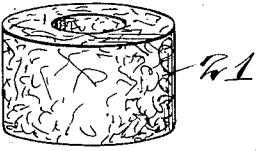
FIG-3-
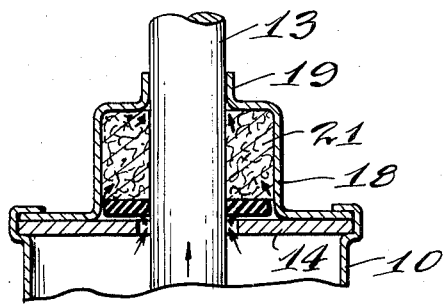
FIG-2-
FIG-4-
INVENTOR.
JOHN B. PARSONS
BY
ATTY.

Patented May 6, 1952

2,595,878

UNITED STATES PATENT OFFICE 2,595,878

SEALING DEVICE FOR PISTON AND
CYLINDER ASSEMBLIES

John B. Parsons, Toledo, Ohio

Application July 3, 1948, Serial No. 36,977

4 Claims. (Cl. 309—1)

This invention relates to piston rod sealing devices, and an object is to produce a simple and efficient piston rod sealing device associated with the cylinder in which the piston reciprocates and which is adapted to enable the egress of fluid from the cylinder during the movement of the piston in one direction but which militates against the ingress of fluid to the cylinder upon movement of the piston in the opposite direction.

For purpose of illustration but not of limitation, an embodiment of the invention is shown in the accompanying drawings, in which Figure 1 is a fragmentary elevation, partly in section, of a piston and cylinder assembly showing the sealing device;

Figure 2 is a fragmentary sectional view showing the operation of the sealing device upon movement of the piston toward it for exhausting or forcing fluid from the cylinder to the outside through the sealing device;

Figure 3 is a perspective view of the felt packing forming part of the sealing device; and Figure 4 is a perspective view of the rubber-like washer also forming part of the sealing device.

The illustrated embodiment of the invention comprises a metallic cylinder 10 which is closed at its lower end by a cap 11, and reciprocable within the cylinder is a piston 12 having a piston rod 13. At the opposite or upper end of the cylinder is a metallic disc 14, the end portion of the cylinder being crimped over as indicated at 15, to hold the disc in place. The disc 14 has a central aperture 16 through which the piston rod 13 passes, and bearing against the upper side of the disc 14 is a flange 17 of an annular cup 18, the upper end of which is reduced into nozzle-like form 19 for slidably embracing the piston rod 13. The crimped-over end 15 also engages the edge portion of the flange 17 to hold it securely in place.

Bearing against the upper side of the metallic disc 14 is a washer 20 of rubber or other suitable resilient and flexible material. The aperture in the washer 20 is such as snugly to fit the piston rod 13 which has a wiping action along the rod during its reciprocation. Filling the remainder of the cup 18 is an annulus 21 of felt or similar material, which is compressed in order intimately to engage the piston rod 13 and also exert a yielding pressure against the upper side of the rubber washer 20. Although felt is suitable for the purpose, any similar material may be used which is of a compressible and somewhat resilient nature. Preferably the annulus 21 is impregnated with a lubricant to facilitate the reciprocatory movement of the piston rod 13.

In operation, when the piston 12 moves upwardly in the cylinder 10, any fluid therein such as air or water, will be forced upwardly and the pressure generated will cause the rubber-like washer 20 to move upwardly away from the disc 14, substantially as indicated in Figure 2, the fluid either passing through the felt annulus 21 or between the annulus and the inner walls of the cup 18 and thus finds its way to the outside. Upon the downward movement of the piston 12, a suction or partial vacuum is created above the piston causing the rubber-like washer 20 to abut against the rigid metallic disc 14 and thus militate against the ingress of fluid to the inside of the cylinder. Thus the washer 20, in cooperation with the felt annulus 21 and the metallic disc 14, during the reciprocatory movement of the piston 12, operates automatically to expel fluid from the inside of the cylinder above the piston but militates against fluid entering the cylinder.

From the above, it will be apparent that air or moisture from the outside are definitely prevented from entering the cylinder and any air or moisture within the cylinder are expelled during the reciprocatory action of the piston. In this manner, rusting of the inside of the cylinder is prevented and its life and usefulness accordingly enhanced. A structure of this character is particularly advantageous when the piston and cylinder assembly is employed in connection with the raising and lowering of windows of automobiles where the apparatus is not operated constantly but rather is employed intermittently to accomplish the desired result. Since the automobile, in the main, is out of doors, and exposed to weather conditions including rain and snow, it is important that a sealing device of this character be employed. Otherwise, rusting of the inside of the cylinder will take place and not only interfere with the reciprocating movement of the piston but shorten the working life of the parts.

It is to be understood that numerous changes in details of construction, arrangement and operation may be effected without departing from the spirit of the invention especially as defined in the appended claims.

What I claim is:

1. Valve seal device for piston and cylinder assemblies in which the piston rod reciprocates through a closed end of the cylinder, said device comprising a relatively rigid disc member at one end of the cylinder and through which the piston rod reciprocates, a centrally apertured rubber-like washer abutting the outer side of said member and sealingly embracing the rod, a cap at one side of the washer-like member and apertured to accommodate the rod, said washer and cup defining a space for the escape of fluids around the periphery of the washer, and compressible porous material within said cup for embracing the rod and yieldingly holding the washer against the disc member whereby movement of the piston toward said washer generates pressure slightly to shift the washer against the compressible material and allow escape of fluid from the cylinder and movement of the piston in the opposite direction creates a partial vacuum within the cylinder to hold the washer tightly against the member and militate against the ingress of fluid to the cylinder.

2. Valve seal device for piston, piston rod and cylinder assemblies comprising a rubber-like washer having a central opening of such size as to have wiping action with the piston rod reciprocating therethrough and sealing by embracing same, resilient pressure means bearing against one side of said washer, a cup-like enclosure for said pressure means and providing an opening loosely to receive the piston rod for permitting the passage of fluids, there being a venting passage between said cup-like enclosure and the outer periphery of said washer, a substantially rigid backing for the opposite side of said washer, said backing being imperforate except for an opening through which the piston rod passes whereby the pressure means and washer yield upon movement of the piston in one direction and in response to generated positive pressure to vent fluids and the washer seats firmly against the backing in response to negative pressure to militate against reverse flow of fluids upon movement of the piston in the opposite direction.

3. A sealing structure as claimed in claim 1, in which the compressible porous material comprises felt.

4. A sealing structure as claimed in claim 1, in which the compressible porous material comprises an annulus of lubricant impregnated felt.

JOHN B. PARSONS.

REFERENCES CITED

The following references are of record in the file of this patent:

UNITED STATES PATENTS

| Number | Name | Date |
|---|---|---|
| 1,964,063 | Kagi | June 26, 1934 |
| 2,132,035 | Leipold | Oct. 4, 1938 |